United States Patent
Lee

(10) Patent No.: US 8,260,349 B2
(45) Date of Patent: Sep. 4, 2012

(54) IMAGE/AUDIO PLAYBACK DEVICE OF MOBILE COMMUNICATION TERMINAL

(75) Inventor: Sun-Dong Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 1016 days.

(21) Appl. No.: 12/186,782

(22) Filed: Aug. 6, 2008

(65) Prior Publication Data

US 2008/0317267 A1 Dec. 25, 2008

Related U.S. Application Data

(62) Division of application No. 11/236,522, filed on Sep. 28, 2005, now Pat. No. 7,894,854.

(30) Foreign Application Priority Data

Oct. 26, 2004 (KR) .................. 10-2004-0085782
Oct. 26, 2004 (KR) .................. 10-2004-0085786

(51) Int. Cl.
*H04M 1/00* (2006.01)

(52) U.S. Cl. ............. 455/556.1; 455/556.2; 455/563; 455/566; 455/557; 348/575; 348/588; 381/300; 704/500

(58) Field of Classification Search ............. 455/556.1, 455/556.2, 563, 566, 557; 381/300; 348/571, 348/575, 588; 704/500
See application file for complete search history.

(56) References Cited

U.S. PATENT DOCUMENTS

| | | | |
|---|---|---|---|
| 5,412,486 A | 5/1995 | Bannai et al. | |
| 5,555,098 A | 9/1996 | Parulski | |
| 5,854,902 A | 12/1998 | Wilson et al. | |
| 6,337,708 B1 | 1/2002 | Furlan et al. | |
| 6,424,385 B1 | 7/2002 | Koyama et al. | |
| 6,650,889 B1 * | 11/2003 | Evans et al. ............. | 455/412.1 |
| 6,711,379 B1 * | 3/2004 | Owa et al. ................ | 455/3.01 |
| 6,774,939 B1 | 8/2004 | Peng | |
| 6,819,356 B1 | 11/2004 | Yumoto | |
| 6,912,531 B1 | 6/2005 | Matsumoto et al. | |
| 7,121,469 B2 | 10/2006 | Dorai et al. | |
| 7,129,918 B2 | 10/2006 | Kimura | |
| 7,173,628 B1 * | 2/2007 | Kawai ...................... | 345/531 |
| 7,266,254 B2 | 9/2007 | Ishikawa et al. | |
| 7,280,753 B2 | 10/2007 | Oya et al. | |
| 7,349,623 B1 | 3/2008 | Fujita et al. | |

(Continued)

FOREIGN PATENT DOCUMENTS

KR 10-2004-0075433 8/2004

OTHER PUBLICATIONS

Office Action dated Nov. 16, 2009 (for co-pending U.S. Appl. No. 11/236,522).

(Continued)

*Primary Examiner* — Marceau Milord

(74) *Attorney, Agent, or Firm* — H.C. Park & Associates, PLC

(57) ABSTRACT

Disclosed is an image/audio playback technology in a mobile communication terminal. According to the present invention, a single image is divided into two halves, i.e., left-half and right-half images, which are displayed on two mobile communication terminals, respectively. In addition, two mobile communication terminals can play left-side and right-side audio data, respectively, which compose stereo audio data, according to the relative locations of the two mobile communication terminals.

14 Claims, 9 Drawing Sheets

U.S. PATENT DOCUMENTS

| | | | |
|---|---|---|---|
| 7,454,090 B2 * | 11/2008 | Wilcock et al. | 382/305 |
| 7,456,867 B2 | 11/2008 | Yamada | |
| 7,457,825 B2 | 11/2008 | Li et al. | |
| 7,466,349 B2 | 12/2008 | Iijima | |
| 7,575,171 B2 | 8/2009 | Lev | |
| 7,602,973 B2 | 10/2009 | Li | |
| 7,701,483 B1 | 4/2010 | Takiguchi et al. | |
| 7,764,277 B2 | 7/2010 | Klassen et al. | |
| 7,777,780 B2 | 8/2010 | Oya et al. | |
| 7,804,528 B2 | 9/2010 | Bando | |
| 7,835,617 B2 | 11/2010 | Fujita et al. | |
| 7,894,854 B2 * | 2/2011 | Lee | 455/556.1 |
| 7,903,930 B2 | 3/2011 | Fujita et al. | |
| 8,090,405 B2 | 1/2012 | Lee | |
| 2002/0024602 A1 | 2/2002 | Juen | |
| 2006/0058079 A1 | 3/2006 | Goto | |
| 2007/0060152 A1 | 3/2007 | Sakamoto | |

OTHER PUBLICATIONS

Office Action dated Apr. 30, 2009 (for co-pending U.S. Appl. No. 11/236,522).

Non-Final Office Action issued May 27, 2010 in U.S. Appl. No. 11/236,522.

Notice of Allowance of U.S. Appl. No. 13/015,922 issued on Aug. 30, 2011.

Notice of Allowance of U.S. Appl. No. 11/236,522 issued on Oct. 18, 2010.

Office Action dated Nov. 18, 2008 (for co-pending U.S. Appl. No. 11/236,522).

Non-Final Office Action of U.S. Appl. No. 13/015,922 issued on Apr. 5, 2011.

Non-Final Office Action dated on Apr. 3, 2012 issued for U.S. Appl. No. 13/328,977.

Notice of Allowance issued on Jul. 18, 2012 in U.S. Appl. No. 13/328,977.

* cited by examiner

IMAGE/AUDIO PLAYBACK DEVICE OF MOBILE COMMUNICATION TERMINAL

CROSS REFERENCE TO RELATED APPLICATIONS

This application is a divisional application of U.S. patent application Ser. No. 11/236,522, filed on Sep. 28, 2005, which claims priority from and the benefit of Korean Patent Application No. 10-2004-0085786, filed on Oct. 26, 2004, and Korean Patent Application No. 10-2004-0085782, filed on Oct. 26, 2004, which are hereby incorporated by reference for all purposes as if fully set forth herein.

BACKGROUND OF THE INVENTION

1. Field of the Invention

The present invention relates to an image and audio playback technology in a mobile communication terminal and, more particularly, to a technology in which a single image is divided into two halves, i.e., a left-half image and a right-half image, which are displayed on two mobile communication terminals, respectively, and, in addition, left-side and right-side audio data composing stereo audio data can be played in two mobile communication terminals, respectively, according to the relative locations of the two mobile communication terminals.

2. Description of Related Art

With the development of wireless/wireline telecommunication technologies, users can enjoy various kinds of contents through mobile communication terminals. Examples of the content include content offered through mobile communications (photos, moving pictures, animation, games, bell sounds, sound sources, etc.), and content offered through a cable connection between a personal computer and a mobile communication terminal. In addition, users using mobile communication terminals with a camera function can view content such as photos or moving pictures taken by the mobile communication terminals through their own mobile communication terminals.

Further, mobile communication terminals with a broadcast receiving function have been recently released onto the market. Examples of broadcast channels include over-the-air broadcast, such as TV and radio, and digital broadcast channels. The users can view such broadcast content through the mobile communication terminals.

The users can view image content realistically through a mobile communication terminal with a display device as wide as possible. However, there is a problem in that the mobile communication terminal has a limitation in size. Korean Unexamined Patent Application Publication No. 2004-75433 discloses a technology to overcome such a problem. According to the technology, two mobile communication terminals receive two divided image files, respectively, which are in turn displayed to form a single full screen.

A detailed description thereof will now be given. According to the above-mentioned publication, there is provided a method of forming a single full-screen image through two mobile communication terminals which receive two image files obtained by dividing the single full-screen image file into two halves, the method including the steps of: (a) transmitting the two image files from a server with a shared key having the two image files to the two mobile communication terminals, respectively, where the two image files form a single full-screen image, (b) requesting the shared key from the server and receiving the shared key at any one of the mobile communication terminals having received the image files, (c) transmitting the shared key input to any one of the mobile communication terminals to another adjacent mobile communication terminal, and (d) transmitting a simultaneous execution signal from the mobile communication terminal having received the shared key to the other mobile communication terminal.

As a result, the two divided images simultaneously displayed on the two mobile communication terminals forms a single full-screen image. In an embodiment, the adjacent mobile communication terminals are communicated with each other using infrared data association. In step (c), when the shared key is input to the mobile communication terminal, the inputted shared key is compared with a shared key of the transmitted image file. When they are determined to match each other, the image file is transmitted to an adjacent other mobile communication terminal.

A more detailed description of the technology described 5 in the above publication will now be given in consideration of a method of implementing a division playback function, available content range, convenience, and the like.

According to the above-mentioned publication, a communication service provider or content provider divides a single image file into left-half and right-half screen images, which are in turn encoded. Two mobile communication terminals download the left-half and right-half screen images, respectively, and play the respective screen images. The two terminals have only to set the playback time for the two screen image files so that the two screen image files can be simultaneously played. That is, the terminals have their respective screen image files and play the screen image files by transmitting a start signal to each other through infrared data association so as to set the playback start time for the respective image files.

If the above-mentioned method is applied to general image files rather than the divided screen image files, the same images will be simultaneously displayed on the two terminals as in a multi-vision TV. Thus, the technology disclosed in the above publication corresponds to a technology related to an image service, one of mobile services, rather than a technology realized in the mobile communication terminal. In addition, according to the above-mentioned publication, mobile carriers or service providers should create left-half and right-half image files. That is, a single image file is divided into two halves, i.e., left-half and right-half screen image data, each of which is in turn separately encoded and then transmitted to a different one of two terminals. Thus, the service providers should perform the above-mentioned operations for all the image files used by general users and store the two divided image files for a few users using the above service.

In addition, the divided image files are not played in real time. In more detail, the two terminals download their respective left-half and right-half image files. Next, any one of the two terminals downloads a shared key. The two terminals set a timing using the shared key and play the two divided image files simultaneously. Thus, since the two image files are played back after they are downloaded and the shared key is received, the image files cannot be played in real time. Further, it is meaningless that only a single terminal plays an image file stored therein.

Meanwhile, the above-mentioned publication does not disclose a method of processing audio data when content is played using two mobile communication terminals. The audio data may exist alone in the form of an MP3 file, or exist in combination with image data such as MPEG4 data. Recently released mobile communication terminals offer a stereo output function. Accordingly, users can enjoy audio in stereo sound through earphones or speakers provided in the mobile communication terminals.

SUMMARY OF THE INVENTION

The present invention provides a technology in which a mobile communication terminal divides full-screen image data into left-half and right-half screen image data in real time through a software process, recognizes the relative location of the mobile communication terminal corresponding to another mobile communication terminal, displays any one of the two divided screen image data corresponding to the location of the mobile communication terminal, and transmits the remaining one through a communication interface unit to a corresponding communication interface unit provided in the other mobile communication terminal.

The present invention further provides a technology in which two mobile communication terminals can play their respective audio data, i.e., left-side and right-side audio data, according to the relative locations of the two mobile communication terminals.

According to an aspect of the present invention, there is provided an image playback device of a mobile communication terminal, comprising: a control unit which recognizes the relative location of the mobile communication terminal corresponding to another mobile communication terminal and offers left-side or right-side location information corresponding to the relative location; a codec unit decoding image data; an image dividing unit which divides the decoded image data into two halves, i.e., left-half image data and right-half image data, and transmits any one of the two divided image data to a display unit and transmits the remaining one to a communication interface unit according to the location information from the control unit; a display unit displaying any one of the two divided image data; and a communication interface unit transmitting the remaining one of the two divided image data to a corresponding communication interface unit provided in the other mobile communication terminal.

According to another aspect of the present invention, there is provided an image playback device of a mobile communication terminal, comprising: a control unit which recognizes the relative location of the mobile communication terminal corresponding to another mobile communication terminal; a communication interface unit which receives any one of two divided image data, i.e., left-half image data and right-half image data, which are obtained by dividing original image data into two halves by means of the other mobile communication terminal, from a corresponding communication interface unit provided in the other mobile communication terminal; and a display unit displaying the received image data.

According to a further aspect of the present invention, there is provided an image playback method of a mobile communication terminal, the method comprising the steps of: recognizing the relative location of the mobile communication terminal corresponding to another mobile communication terminal; decoding image data; dividing the decoded image data into two halves, i.e., left-half image data and right-half image data; and transmitting any one of the two divided image data to a display unit and transmitting the remaining one through a communication interface unit to a corresponding communication interface unit provided in the other mobile communication terminal, according to the location of the mobile communication terminal.

According to a further aspect of the present invention, there is provided an image playback method of a mobile communication terminal, the method comprising the steps of: recognizing the relative location of the mobile communication terminal corresponding to another mobile communication terminal; receiving any one of two divided image data, i.e., left-half image data and right-half image data, which are obtained by dividing original image data into two halves by means of the other mobile communication terminal, through a communication interface unit from a corresponding communication interface unit provided in the other mobile communication terminal; and displaying the divided image data which is received through the communication interface unit.

The image data decoded by the codec unit may be provided from at least one of the mobile communication unit, the camera unit, the broadcast receiving unit, and the storing unit.

The codec unit may perform a resizing operation at the request of the control unit so that the decoded image data has the same pixel size as the display unit.

The control unit may recognize the relative location of the mobile communication terminal according to whether a connector coupled with the other mobile communication terminal is a left-side or a right-side connector.

The left-side and the right-side connectors may be a receptacle and a plug, respectively, or the left-side and the right-side connectors may be a plug and a receptacle, respectively.

The image playback device may further comprise a buffering unit which buffers image data divided by the image dividing unit and transmits the buffered image data to the display unit, wherein the control unit transmits a synchronization control signal to the other mobile communication terminal through the communication interface unit according to a buffering condition of the buffering unit.

When an order of division playback of image data is input from the input unit, the control unit may notify the other mobile communication terminal through the communication interface unit that the control unit is a main terminal.

According to a further aspect of the present invention, there is provided an audio playback device of a mobile communication terminal, comprising: a control unit which recognizes the relative location of the mobile communication terminal corresponding to another mobile communication terminal and offers left-side or right-side location information corresponding to the relative location; a codec unit which decodes audio data and outputs decoded left-side and right-side audio data; a path switching unit which transmits any one of the two decoded audio data to an audio output unit and transmits the remaining one to a communication interface unit according to the location information from the control unit; an audio output unit which processes and outputs the one of the two divided audio data to the outside; and a communication interface unit transmitting the remaining one of the two divided audio data to a corresponding communication interface unit provided in the other mobile communication terminal.

According to a further aspect of the present invention, there is provided an audio playback device of a mobile communication terminal, comprising: a control unit which recognizes the relative location of the mobile communication terminal corresponding to another mobile communication terminal; a communication interface unit which receives any one of two divided audio data, i.e., left-side audio data and right-side audio data, which are obtained by decoding and dividing original audio data into two halves by means of the other mobile communication terminal, from a corresponding communication interface unit provided in the other mobile communication terminal; and an audio output unit outputting the received audio data to the outside.

According to a further aspect of the present invention, there is provided an audio playback method of a mobile communication terminal, the method comprising the steps of: recognizing the relative location of the mobile communication terminal corresponding to another mobile communication terminal; decoding audio data and outputting decoded left-side and right-side audio data; and transmitting any one of the two decoded audio data through an audio output unit to the outside and transmitting the remaining one through a communication interface unit to a corresponding communication interface unit provided in the other mobile communication terminal, according to the location of the mobile communication terminal.

According to a further aspect of the present invention, there is provided an audio playback method of a mobile communication terminal, the method comprising the steps of: recognizing the relative location of the mobile communication terminal corresponding to another mobile communication terminal; receiving any one of two divided audio data, i.e., left-side audio data and right-side audio data, which are obtained by decoding and dividing original audio data into two halves by means of the other mobile communication terminal, through a communication interface unit from a corresponding communication interface unit provided in the other mobile communication terminal; and outputting the received audio data through an audio output unit to the outside.

The audio data decoded by the codec unit may be transmitted from a mobile communication unit, a camera unit, a broadcast receiving unit, and/or a storing unit.

The control unit may recognize the relative location of the mobile communication terminal according to whether a connector coupled with the other mobile communication terminal is a left-side or a right-side connector.

The left-side and the right-side connectors may be a receptacle and a plug, respectively, or the left-side and the right-side connectors may be a plug and a receptacle, respectively.

The audio playback device may further comprise a buffering unit which buffers audio data outputted from the path switching unit and transmits the buffered audio data to the audio output unit, wherein the control unit transmits a synchronization control signal to the other mobile communication terminal through the communication interface unit according to a buffering condition of the buffering unit.

The audio output unit with a stereo function may output the audio data to the outside through a left output path of stereo output paths when the transmitted audio data corresponds to a left side, and output the audio data to the outside through a right output path of the stereo output paths when the transmitted audio data corresponds to a right side.

When an order of division playback of the audio data is input from the input unit, the control unit may notify the other mobile communication terminal through the communication interface unit that the control unit is a main terminal.

BRIEF DESCRIPTION OF THE DRAWINGS

The above and other features and advantages of the 10 present invention will become more apparent by describing in detail exemplary embodiments thereof with reference to the attached drawings in which.

DETAILED DESCRIPTION OF THE INVENTION

Figure 1:
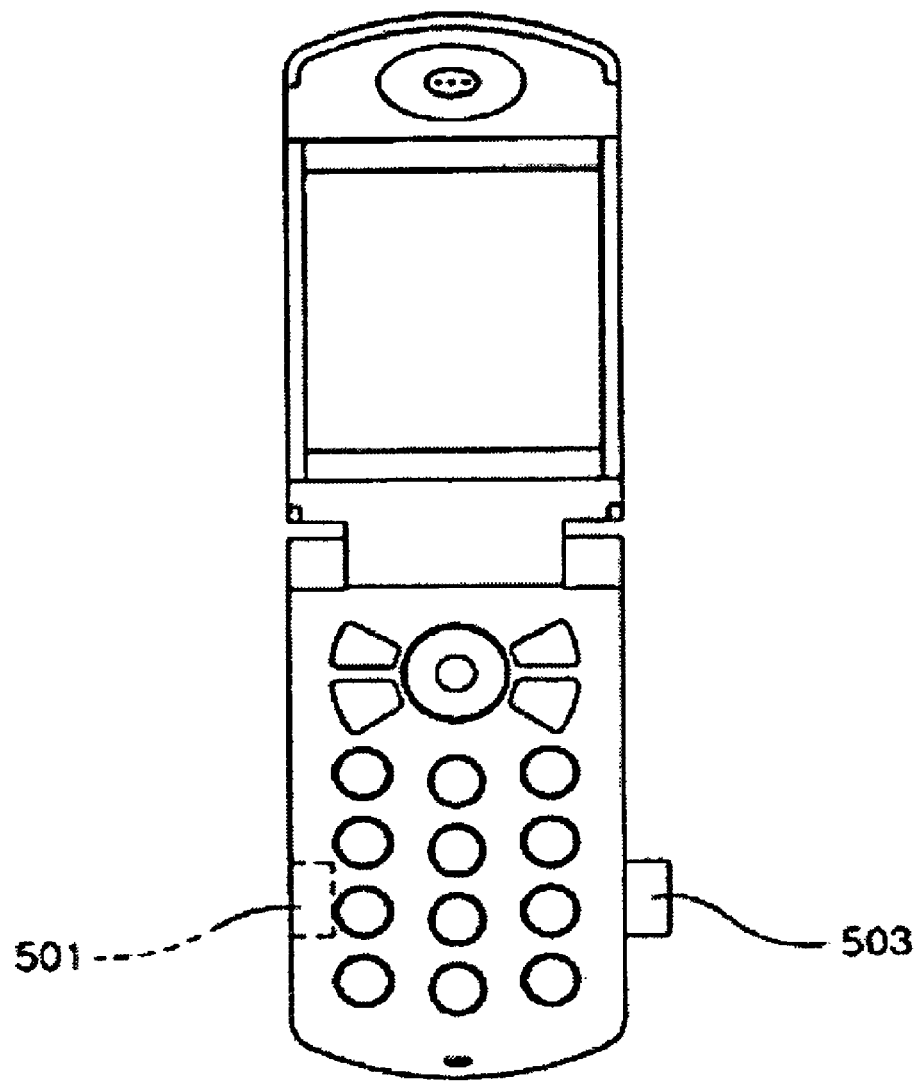
FIG. 1 shows a connector of a mobile communication terminal in accordance with an embodiment of the present invention.

Exemplary embodiments in accordance with the present invention will now be described in detail with reference to the accompanying drawings where like reference numerals designate like elements.

FIG. 1 shows a connector of a mobile communication terminal in accordance with an embodiment of the present invention. The mobile communication terminal includes a left-side connector 501 and a right-side connector 503. In an embodiment, the left-side connector 501 is typically provided in a USB terminal and may be such a structure as a receptacle so that a USB plug can be inserted into it. Meanwhile, the right-side connector 503 is typically provided in a mobile communication terminal and may be a plug to insert into a receptacle.

Figure 2:
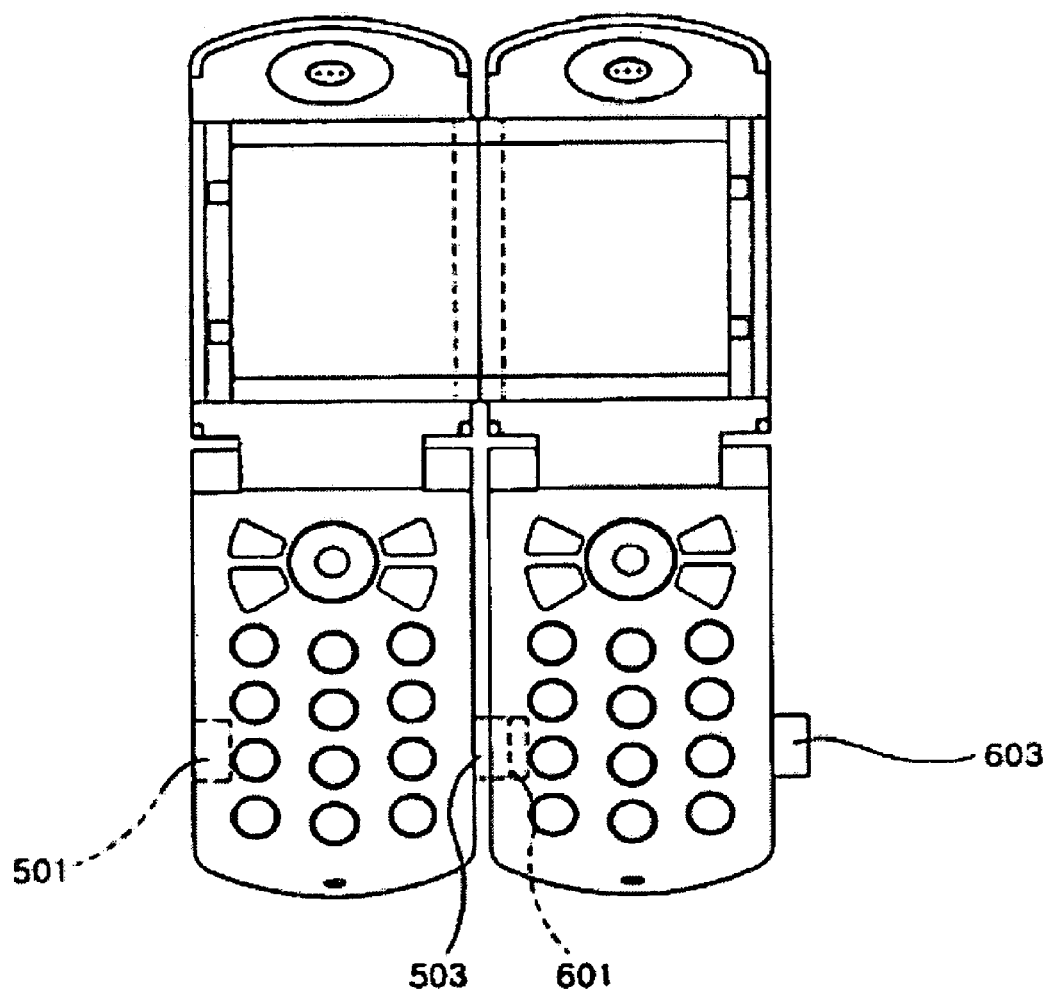
FIG. 2 shows two coupled mobile communication terminals in accordance with an embodiment of the present invention.

FIG. 2 shows two coupled mobile communication terminals in accordance with an embodiment of the present invention. As shown in FIG. 2, a mobile communication terminal is coupled with another mobile communication terminal by means of a connector. The other mobile communication terminal also has a left-side connector 601 and a right-side connector 603. The right-side connector 503 of the mobile communication terminal is coupled with the left-side connector 601 of the other mobile communication terminal. Since the two mobile communication terminals are communicated with each other by directly interconnecting between the right-side connector 503 of the mobile communication terminal and the left-side connector 601 of the other mobile communication terminal, two liquid crystal displays provided in the two mobile communication terminals are also adjacent to each other and thus two different image data appear to be continuously displayed, whereby users can view content more realistically through a wider screen.

Figure 3:
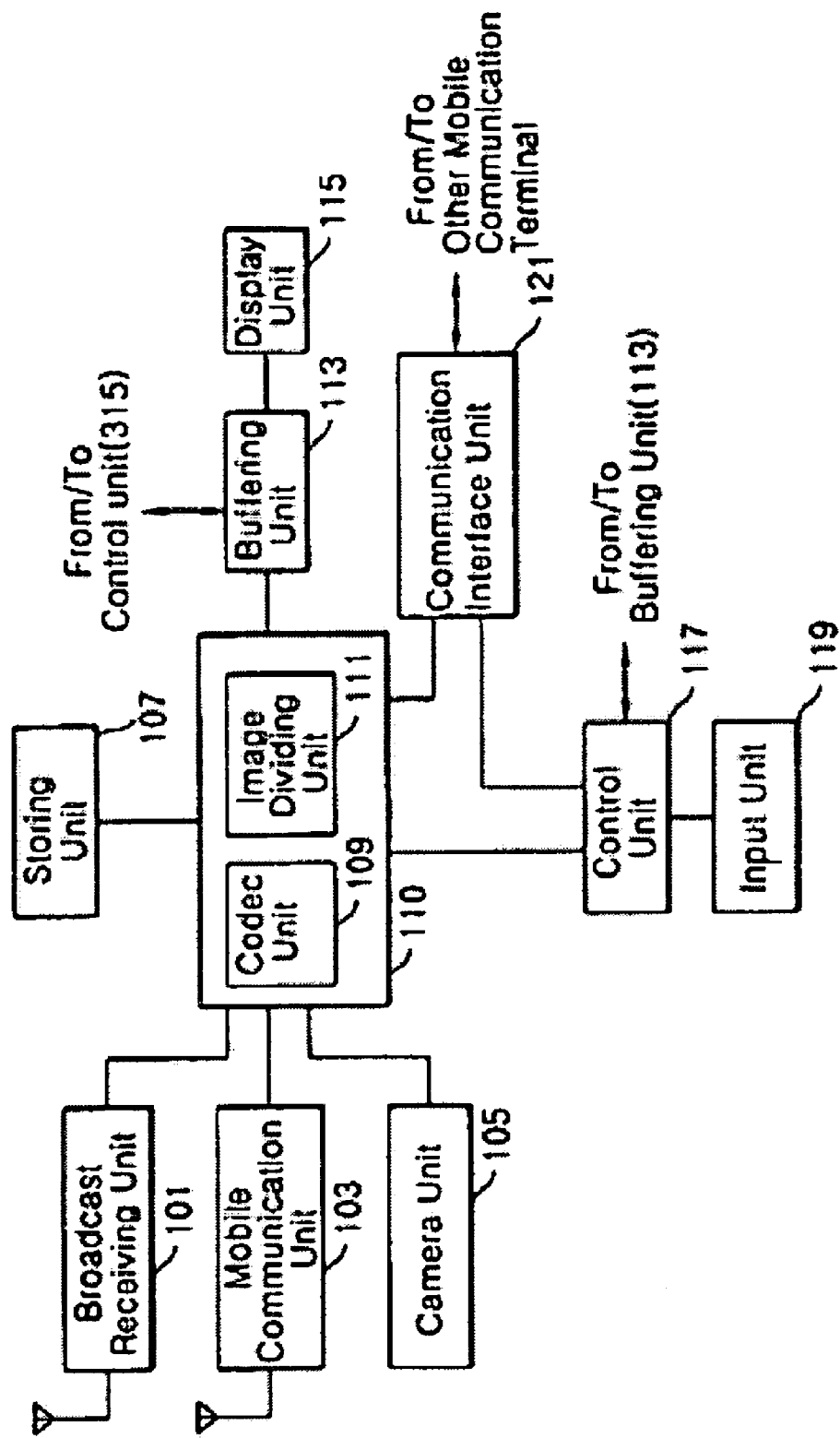
FIG. 3 is a block diagram showing an image playback device of a mobile communication terminal in accordance with an embodiment of the present invention.

FIG. 3 shows an image playback device of a mobile communication terminal in accordance with an embodiment of the present invention. The mobile communication terminal comprises a control unit 117 and its subsidiary circuits, a broadcast receiving unit 101, a camera unit 105, and a signal processing unit 110.

Examples of the subsidiary circuits include an input unit 119, a display unit 115 displaying menus and operating states, a mobile communication unit 103 extracting voice and data signals from radio signals transmitted/received via an antenna, a storing unit 107, a buffering unit 113, an audio output unit 114 (shown on FIG. 7), and a communication interface unit 121.

The input unit 119 and the display unit 115 may have their respective typical configurations. The mobile communication unit 103 includes an antenna for communication with base stations and a radio frequency (RF) module. The mobile communication unit 103 is configured to be available in existing cellular systems, such as CDMA, PDC and GSM, as well as mobile communication systems to appear in the future. The storing unit 107 stores program execution files including main programs and associated data. The storing unit 107 is preferably a single chip including an SRAM (static random access memory) having a capacity of several mega bits and a flash memory having a capacity of tens of mega bits. The buffering unit 113 temporarily stores data inputted during operation of the mobile communication terminal. The audio output unit 114 converts sound signals received from the buffering unit 113 or the control unit 117 into audio signals. The communication interface unit 121 is means configured to communicate user data (including image data) and various control signals using wireless/wireline communication interfaces set in advance between two mobile communication terminals (phone-to-phone) of the same type. In an embodiment, the communication interface unit 121 may be implemented using infrared data association or serial communication through RS-232C or the like.

The camera unit 105 outputs image data of objects captured by an image pickup device. The camera unit 105 may include a lens system which consists of one or more small-sized lenses and focuses light, an image pick up device converting a light signal received from the lens system into an analog electrical signal, a conversion part which processes and converts the signal outputted from the image pickup device into a digital signal and then converts it to a format suitable for an input to the signal processing unit, and a camera control part controlling the operation of the entire components composing the camera unit 105. The image pickup device typically includes a CMOS or CCD pickup device. The image pickup device is a well-known element configured to convert light into an electrical signal with respect to each pixel and sequentially output the electrical signals in synchronization with a clock. The conversion part converts voltage or current proportional to the brightness of an image outputted from the image pickup device into digital data, which is in turn converted to YUV format data.

The signal processing unit 110 has been originally developed by the present applicant for signal processing for a camera phone, and has been employed in the broadcast receiving unit 101 without any structural modification. In addition, the signal processing unit 110 for the camera unit 105 can be shared by the broadcast receiving unit 101 without the need to add an extra signal processing unit. The signal processing unit 110 processes an image signal inputted from another mobile communication terminal through the broadcast receiving unit 101, the mobile communication unit 103, the camera unit 105, and the communication interface unit 121, and outputs it to the display unit 115. A detailed description will be given of the configuration and operation of the signal processing unit 110.

In the present invention, a baseband circuit of the mobile communication unit 103 and most circuits of the control unit 117 are integrated into a commercially available integrated circuit (IC). In an embodiment, this IC chip, which is typically called a mobile station modem (MSM) chip, includes hardware for communication processing, a digital signal processor, and a general-purpose microprocessor. In an embodiment, the control unit 117 recognizes the relative location of a mobile communication terminal corresponding to another mobile communication terminal, and offers left-side or right-side location information based on the recognized location to the signal processing unit 110.

There are so many methods to recognize the relative location of a mobile communication terminal corresponding to another mobile communication terminal. In an example, a user may set the relative location in person via the input unit 119. For example, if a mobile communication terminal is set to "a left-side location" via the input unit 119, then the control unit 117 outputs left-half image data of divided image data to the display unit 115, and outputs right-half image data to another mobile communication terminal (not shown) via the communication interface unit 121.

In an embodiment, if the control unit 117 recognizes that it has been coupled with another mobile communication terminal via the communication interface unit 121, then it recognizes the location of the mobile communication terminal according to whether a connector coupled to the other mobile communication terminal is a left-side or a right-side connector. For example, the control unit 117 recognizes the relative location of the mobile communication terminal as a left side when a connector coupled to the other mobile communication terminal is a right-side connector, and recognizes the relative location of the mobile communication terminal as a right side when a connector coupled to the other mobile communication terminal is a left-side connector.

The configuration and operation of the signal processing unit 110 will now be described in detail. In an embodiment, the signal processing unit 110 may include a codec unit 109 and an image dividing unit 111. The codec unit 109 may be a typical MPEG4 codec unit which decodes image data. Since the present invention deals with image data that can be decoded by the codec unit 109, the image data may be downloaded or down streamed from an external server (not shown) and in turn transmitted from the mobile communication unit 103. In addition, the image data may be transmitted from the camera unit 105 as photographed image data or transmitted from the broadcast receiving unit 101 as broadcasted image data. Further, the image data may be data stored in the storing unit 107.

The image dividing unit 111 divides the decoded image data into left-half and right-half image data. According to the location of a mobile communication terminal, any one of the two divided image data is transmitted to the display unit 115, and the remaining one is transmitted via the communication interface unit 121 to a corresponding communication interface unit provided in another mobile communication terminal.

As well known in the art, the signal processing unit 110 does not transmit the decoded image data to the display unit 115 as soon as the image data is decoded. Instead, the signal processing unit writes the decoded image data to the storing unit 107 (e.g., page RAM) temporarily, reads back and transmits it to the display unit 115. According to an embodiment of the present invention, the image dividing unit 111 first writes the image data (general image data) decoded by the codec unit 109 into the storing unit 107.

The image dividing unit 111 makes reference to location information received from the control unit 117. If the relative location of the mobile communication terminal corresponds to a left side, then the left half of the image data stored in the storing unit 107 is read and transmitted to the display unit 115, and the right half is read and transmitted to another mobile communication terminal via the communication interface unit 121. For example, in case of decoded image data having a pixel size of 480×320 pixels, after the entire image data in a page RAM is divided into two halves, a left half (from 1 to 240 pixels in breadth) 240×320 pixels is transmitted to the display unit 115 and a right half (from 241 to 480 pixels in breadth) 240×320 pixels is transmitted to another mobile communication terminal via the communication interface unit 121.

As described above, according to a preferred embodiment of the present invention, the mobile communication terminal does not receive a left-half image or a right-half image from an external server, differently from the prior art. Instead, the mobile communication terminal divides an image into two halves, outputs any one of the two divided images to its display unit (e.g., a main terminal) and transmits the remaining one to another mobile communication terminal (e.g., a sub terminal). Thus, according to the present invention, the control unit 117 recognizes the relative location of a mobile communication terminal corresponding to another mobile communication terminal and offers left-side or right-side location information based on the recognized location to the image dividing unit 111.

In addition, since the present invention deals with 2D image data that can be decoded by the codec unit 109, the image data may be downloaded or down streamed from an external server (not shown) and in turn transmitted from the mobile communication unit 103. In addition, the image data may be transmitted from the camera unit 105 as photographed image data or transmitted from the broadcast receiving unit 101 as broadcasted image data. Further, the image data may be data stored in the storing unit 107.

Meanwhile, according to the present invention, the codec unit 109 further performs a resizing operation so that the pixel size of decoded image data can be equal to the pixel size of the display unit 115. In an embodiment, a display unit in each mobile communication terminal has a fixed pixel size to display image data. For example, a display unit displaying a QVGA-sized image has a pixel 10 size of 240×320 pixels. Accordingly, when image data outputted from the codec unit 109 is divided into two halves, each of the two divided image data has preferably a pixel size of 240×320 pixels. In an embodiment, when the decoded image data outputted from the codec unit 109 has a pixel size of 480×320 pixels, each of the two divided image data has a pixel size of 240×320 pixels and thus an extra process is not needed.

In an embodiment, image data played in a display unit of a single mobile communication terminal is divided into two halves so that each of the two divided image data is played in two different display units provided in two mobile communication terminals. Accordingly, if image data with a pixel size that can be played in a display unit of a single mobile communication terminal is downloaded from an external server, then the pixel size of the downloaded image data should be enlarged to be played back through two display units provided in two mobile communication terminals. That is, if decoded image data outputted from the codec unit 109 has a pixel size of 240×320 pixels and a display unit of each mobile communication terminal has a pixel size of 240×320 pixels, each divided image data should be configured to have a pixel size of 240×320 pixels.

According to an embodiment of the present invention, the control unit 117 requests the codec unit 109 to resize the pixel size of outputted image data. In an embodiment, in case of an MPEG4 codec unit, the resizing request is implemented by adding an order code corresponding to a resizing operation upon programming. For example, the codec unit 109 performs an additional resizing process upon decoding so that image data can be outputted in a pixel size of 480×320 pixels. A resizing method using the MPEG4 codec unit is well known in the art and a detailed description thereof will be omitted herein.

Figure 4:
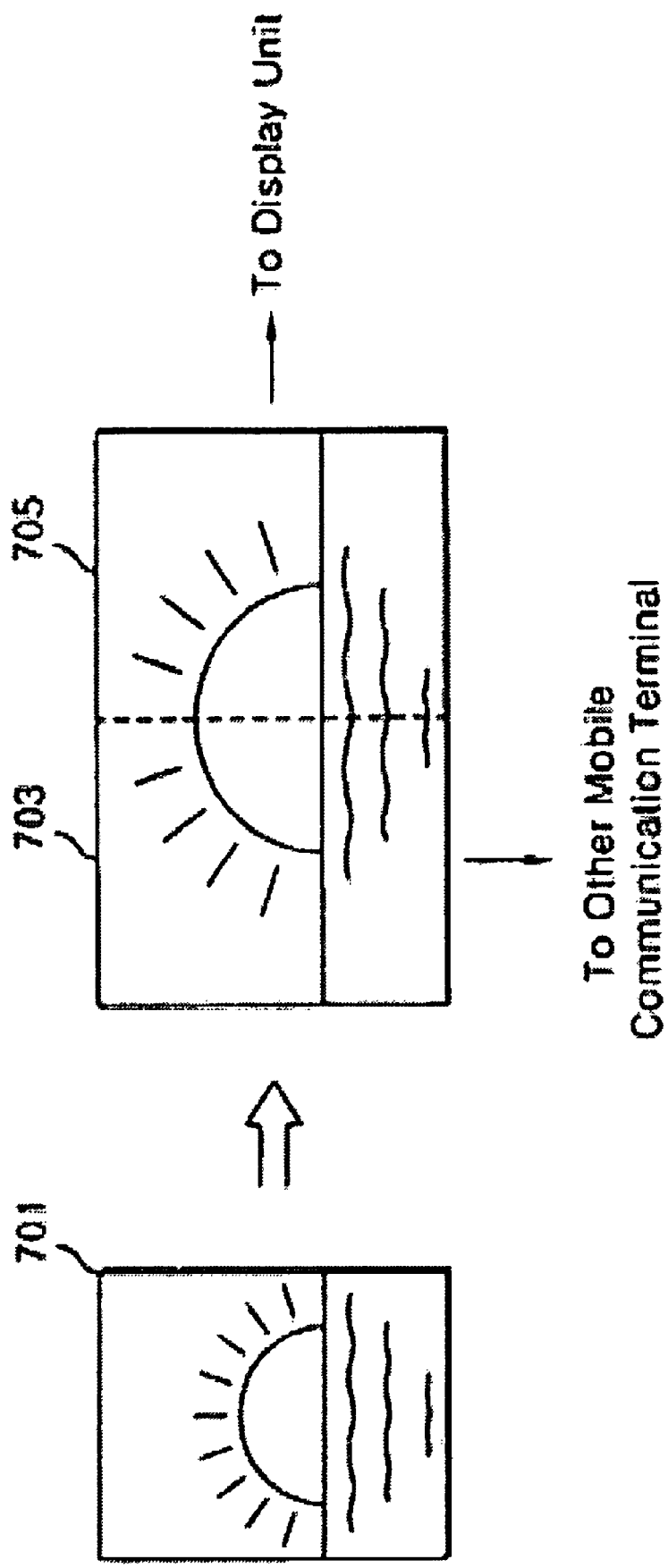
FIG. 4 is a conceptual diagram showing image data resizing performed in a codec unit in accordance with an embodiment of the present invention.

FIG. 4 is a conceptual diagram showing image data resizing performed in the codec unit in accordance with an embodiment of the present invention.

For example, when a single pixel value (e.g., RGB) composing image data corresponds to a single pixel in a liquid crystal display 701, the single pixel value of the image data is outputted to two pixels in the liquid crystal displays 703, 705 at the request of the control unit 117. It should be understood that the single pixel value may be outputted to two and a half or three pixels in liquid crystal displays according to a resizing request.

Figure 5:
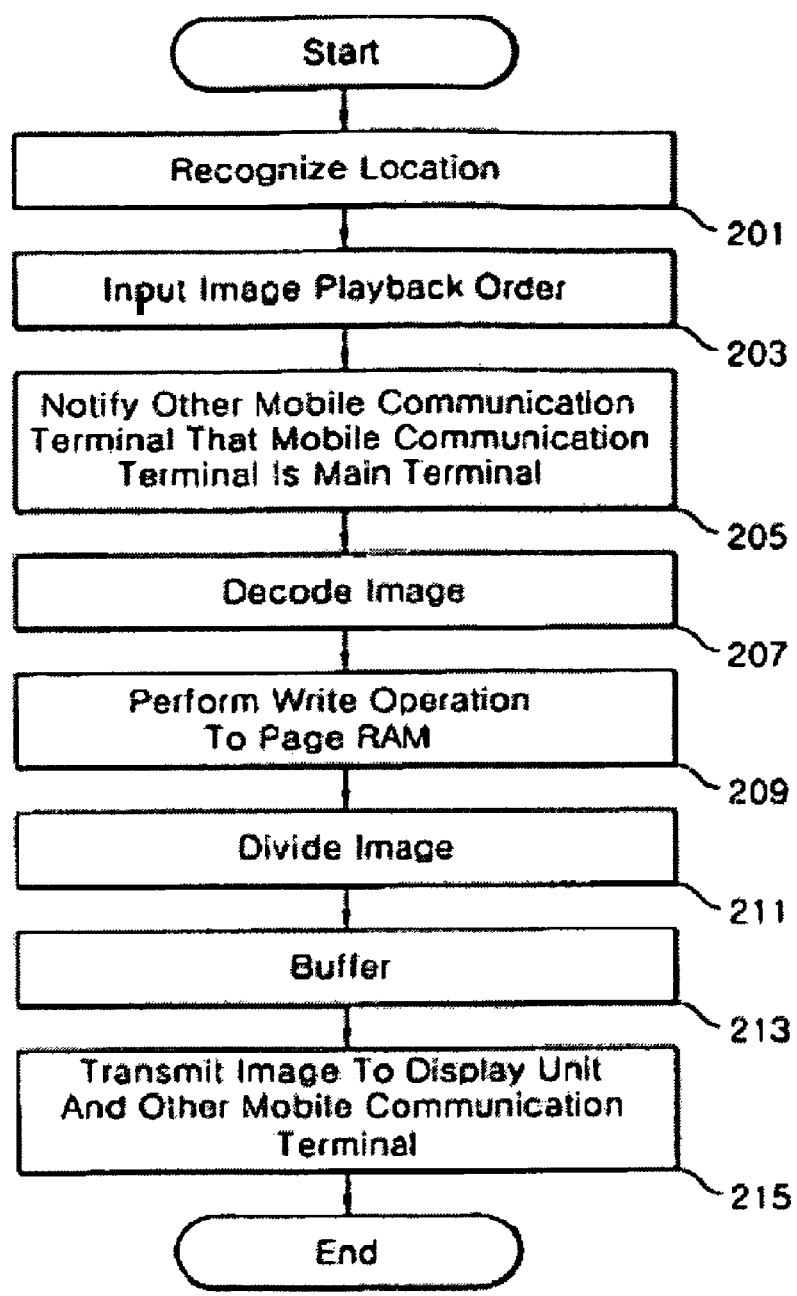
FIG. 5 is a flow chart showing an image playback method of a mobile communication terminal in accordance with an embodiment of the present invention.

FIG. 5 is flow chart showing an image playback method of a mobile communication terminal in accordance with an embodiment of the present invention. According to the present invention, the mobile communication terminal includes a left-side connector and a right-side connector which are coupled with corresponding connectors provided in other mobile communication terminals.

When the control unit 117 recognizes that a mobile communication terminal equipped with the control unit 117 has been coupled with another mobile communication terminal via the communication interface unit 121, it recognizes the location of the mobile communication terminal according to whether a connector coupled with the other mobile communication terminal is a left-side connector or a right-side connector (step 201). Subsequently, when a user inputs an image playback order (step 203), the control unit 117 recognizes itself as a main terminal and notifies it to a control unit of the other mobile communication terminal via the communication interface unit 121 (step 205). Next, the control unit 117 waits for image data to be received. When it receives divided image data through the communication interface unit 121, the control unit 117 decodes the divided image data (step 207).

Next, the control unit 117 writes the image data to a page RAM (step 209). The control unit 117 divides the decoded image data into left half-image data and right half-image data (step 211), and temporarily stores the two divided image data in a buffering unit (step 213). Subsequently, according to the location of the mobile communication terminal, the control unit 117 transmits any one of the two divided image data to the display unit 115, and transmits the remaining one to the other mobile communication terminal (step 215).

Figure 6:
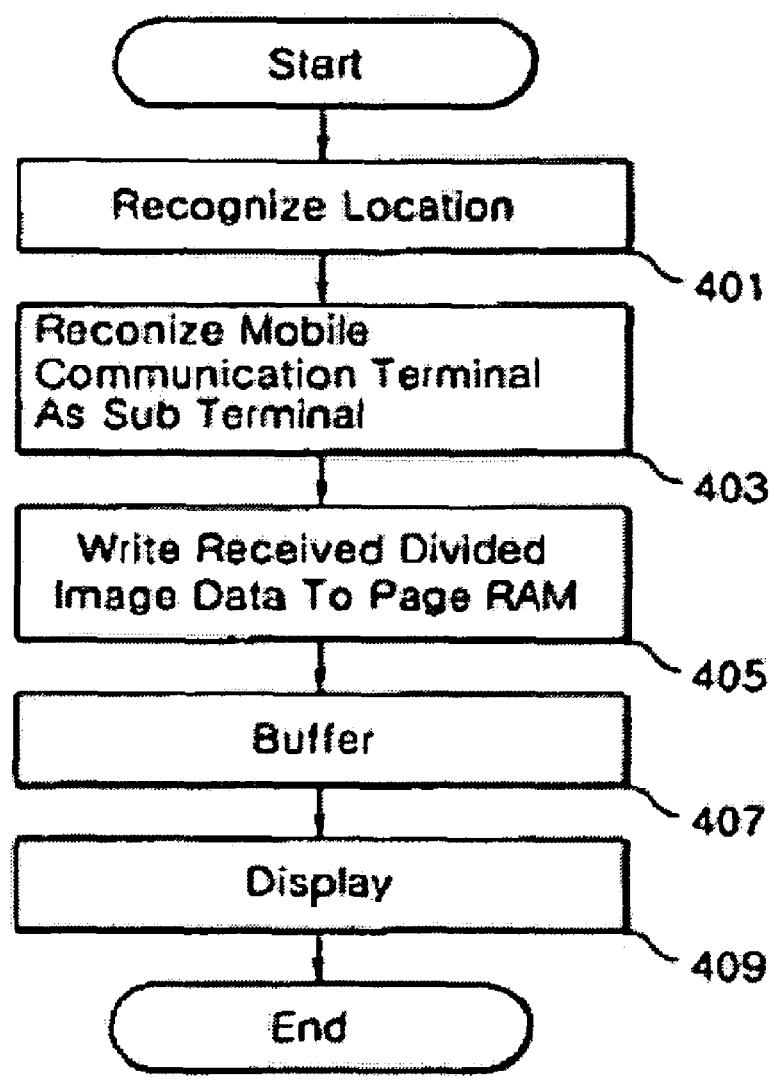
FIG. 6 is a flow chart showing an image playback method of a mobile communication terminal in accordance with another embodiment of the present invention.

FIG. 6 is a flow chart showing an image playback method of a mobile communication terminal in accordance with another embodiment of the present invention. According to a preferred embodiment of the present invention, the mobile communication terminal may be either a main terminal or a sub terminal. In this case, if it has not been determined whether each of two mobile communication terminals indicates a main or sub terminal, each mobile communication terminal should prepare for an image division playback operation.

The control unit 117 recognizes the relative location of a mobile communication terminal corresponding to another mobile communication terminal (step 401). The control unit 117 recognizes whether it is a main terminal or a sub terminal (step 403). In an embodiment, it is determined by a user's playback order signal whether it is a main or a sub terminal. For example, when a user's image playback order is input through the input unit 119 in FIG. 5 (step 203), the control unit 117 recognizes itself as a main terminal and notifies it to a control unit of another mobile communication terminal (step 205). The control unit 315 recognizes itself as a sub terminal and, for example, waits for image data to be received. Next, the image data is divided into two halves, i.e., left-half and right-half image data, by another mobile communication terminal, and the control unit 117 receives any one of the two divided image data from the other mobile communication terminal (step 405). The control unit 117 displays the received, divided image data (step 409).

The present invention may further include the steps of buffering the processed image data and transmitting the buffered image data to the display unit (step 407), and controlling the transmission timing corresponding to a synchronization control signal received from the other mobile communication terminal (not shown). These are steps for synchronizing images played in two mobile communication terminals. It is apparent to those skilled in the art that the two mobile communication terminals are synchronized to the same time source by transmitting a synchronization control signal to another mobile communication terminal according to a buffering condition of the buffering unit, and a detailed description thereof will thus be omitted herein.

Figure 7:
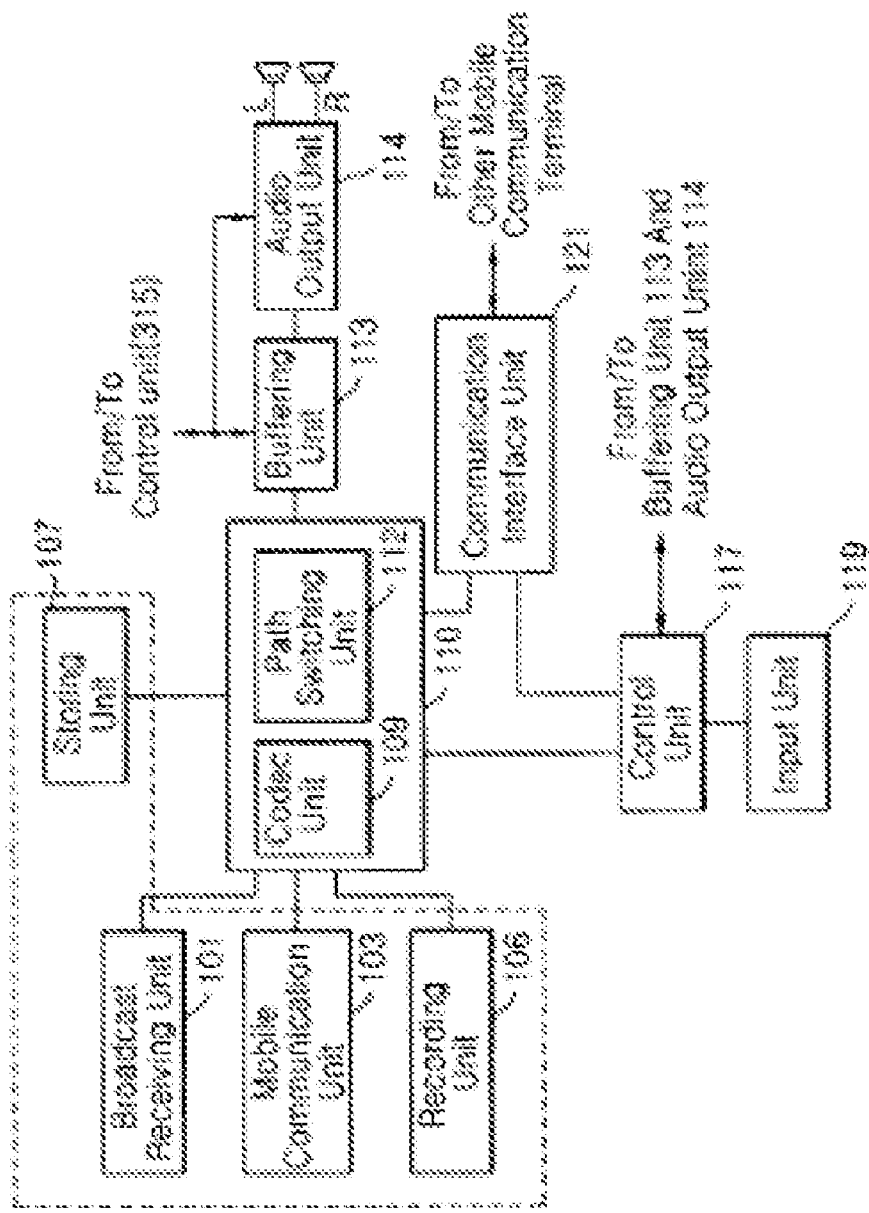
FIG. 7 is a block diagram showing an audio playback device of a mobile communication terminal in accordance with an embodiment of the present invention.

FIG. 7 is a block diagram showing an audio playback device of a mobile communication terminal in accordance with an embodiment of the present invention. The same elements of FIG. 3 are denoted by the same reference numerals. According to the present embodiment, the mobile communication terminal includes a control unit 117 and its subsidiary circuits, which are common in a mobile communication terminal, a broadcast receiving unit 101, a recording unit 106, and a signal processing unit 110. In the present invention, after decoding audio data, the mobile communication terminal (e.g., main terminal) plays any one of two audio data, i.e., left-side audio data and right-side audio data which compose single audio data, and transmits the remaining one to another mobile communication terminal (e.g., sub terminal). Accordingly, the control unit 117 recognizes the relative location of a mobile communication terminal corresponding to another mobile communication terminal and offers left-side or right-side location information based on the recognized location to a path switching unit 112.

The recording unit 106, for example, receives and converts user's audio data into an electrical signal and records it. In an embodiment, the signal processing unit 110 may include the codec unit 109 and the path switching unit 112. The codec unit 109 decodes audio data and may be, for example, a typical MP3 codec unit or MPEG4 codec unit. Under control of the control unit 117, the path switching unit 112 outputs left-side audio data of the left/right audio data outputted from the codec unit 109 to the outside through the audio output unit 114 and transmits right-side audio data to another mobile communication terminal (not shown) through the communication interface unit 121.

In addition, since the present invention deals with general audio data that can be decoded by the codec unit 109, the audio data may be downloaded or down streamed from an external server (not shown) and transmitted from the mobile communication unit 103. The audio data may exist alone or in combination with image data such as MPEG4 data. In addition, the audio data may be transmitted from the recording unit 106 as audio data recorded with photographed image data, or transmitted from the broadcast receiving unit 101 as audio data received with broadcasted image data. Further, the audio data may be data stored in the storing unit 107.

In the present invention, according to the location of a mobile communication terminal which is provided from the control unit 117, the path switching unit 112 outputs any one of two audio data, which are decoded and outputted, through the audio output unit 114 to the outside and transmits the remaining one through the communication interface unit 121 to a corresponding communication interface unit (not shown) provided in another mobile communication terminal. The path switching unit 112 can be provided in the signal processing unit 110 and process paths for digital data in a software manner. However, it can be implemented using an extra hardware.

When the relative location of a mobile communication terminal indicates a left side, it is preferred that left-side audio data is output to the outside through the audio output unit 114 and right-side audio data is transmitted to another mobile communication terminal. On the contrary, when the relative location of a mobile communication terminal indicates a right side, it is preferred that the right-side audio data is output to the outside through the audio output unit 114 and the left-side audio data is transmitted to the other mobile communication terminal. The audio data thus transmitted is output from the other mobile communication terminal to the outside. The audio output unit 114 may include, for example, a converting part, which converts digital audio data to an analog signal, and an amplifying part. In a preferred embodiment, the audio output unit 114 has a stereo function. In an embodiment, the audio output unit 114 may have a left-side output path and a right-side output path. In this case, each output path consists of the above-mentioned converting part and amplifying part. A technique of implementing stereo sound in a mobile communication terminal is well known in the art. Also, it is apparent to those skilled in the art that the audio output unit with a stereo function can be readily implemented from the above description.

In the present invention, according to a switch control signal of the control unit 117, the audio output unit 114 outputs the audio data to the outside through a left-side output path of stereo output paths when transmitted audio data corresponds to a left side. Further, when the transmitted audio data corresponds to a right side, the audio output unit 114 outputs the audio data to the outside through a right-side output path of the stereo output paths. Accordingly, a mobile communication terminal which is located at a left side relative to another mobile communication terminal can output left-side audio data to the outside via a left-side speaker, while the mobile communication terminal which is located at a right side relative to the other mobile communication terminal can output right-side audio data to the outside via a right-side speaker.

As described above, according to the preferred embodiment, after decoding the audio data, the mobile communication terminal (e.g., main terminal) plays any one of two audio data, i.e., left-side audio data and right-side audio data which compose single audio data, and transmits the remaining one to another mobile communication terminal (e.g., sub terminal). Accordingly, the relative location of the mobile communication terminal is recognized corresponding to another mobile communication terminal and the paths are switched based on the recognized location.

In addition, the present invention deals with general audio data that can be decoded by the codec unit 109. Accordingly, the audio data may be one downloaded or down streamed from an external server (not shown) through mobile communication processing. In addition, the audio data may exist alone or in combination with image data such as MPEG4 data. In addition, the audio data may be data recorded with photographed image data, data received with broadcasted image data, or data stored in the storing unit.

According to the present invention, when the relative location of a mobile communication terminal indicates a left side, left-side audio data is output to the outside through the audio output unit and right-side audio data is transmitted to another mobile communication terminal. The right-side audio data is output to the outside from the other mobile communication terminal located at a right side. On the contrary, when the relative location of a mobile communication terminal indicates a right side, the right-side audio data is output to the outside through the audio output unit 114 and the left-side audio data is transmitted to the other mobile communication terminal. The left-side audio data is output to the outside from the other mobile communication terminal located at a left side.

Further, according to the present invention, the audio data is output to the outside through a left-side output path of stereo output paths when transmitted audio data corresponds to a left side. When the transmitted audio data corresponds to a right side, the audio data is output to the outside through a right-side output path of the stereo output paths.

Accordingly, a mobile communication terminal which is located at a left side relative to another mobile communication terminal can output left-side audio data to the outside via a left-side speaker, while the mobile communication terminal which is located at a right side relative to the other mobile communication terminal can output right-side audio data to the outside via a right-side speaker.

Figure 8:
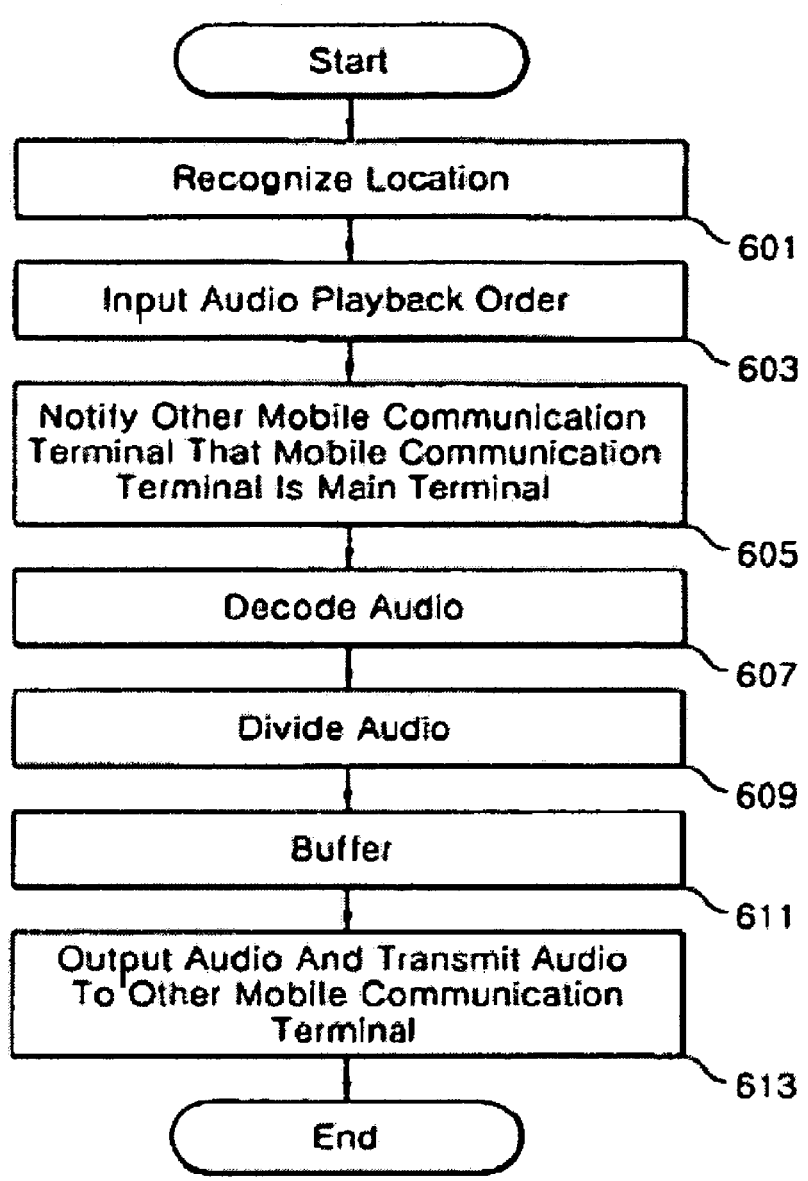
FIG. 8 is a flow chart showing an audio playback method of a mobile communication terminal in accordance with an embodiment of the present invention.

FIG. 8 is a flow chart showing an audio playback method of a mobile communication terminal in accordance with a preferred embodiment of the present invention.

When the control unit 117 recognizes through a communication interface unit that another mobile communication terminal has been coupled with a mobile communication terminal equipped with the control unit 117, it recognizes the location of the mobile communication terminal according to whether a connector coupled to the other mobile communication terminal is a left-side connector or a right-side connector (step 601). Next, when a user's audio playback order is input (step 603), the control unit 117 recognizes itself as a main terminal and notifies it to a control unit of the other mobile communication terminal through the communication interface unit 121 (step 605). Next, the control unit 117 waits for audio data to be received. When the control unit 117 receives divided audio data through the communication interface unit, it decodes the divided audio data (step 607).

Subsequently, according to the location of the mobile communication terminal, the control unit 117 outputs any one of two audio data, which are decoded and outputted, to the outside through the audio output unit 114, and transmits the remaining one to a corresponding communication interface unit provided in the other mobile communication terminal through the communication interface unit 121 (steps 609, 613).

The present invention may further comprise the steps of buffering processed audio data and transmitting the buffered audio data to the audio output unit (step 611), and controlling a transmission timing corresponding to a synchronization control signal received from the other mobile communication terminal through the communication interface unit (not shown).

Figure 9:
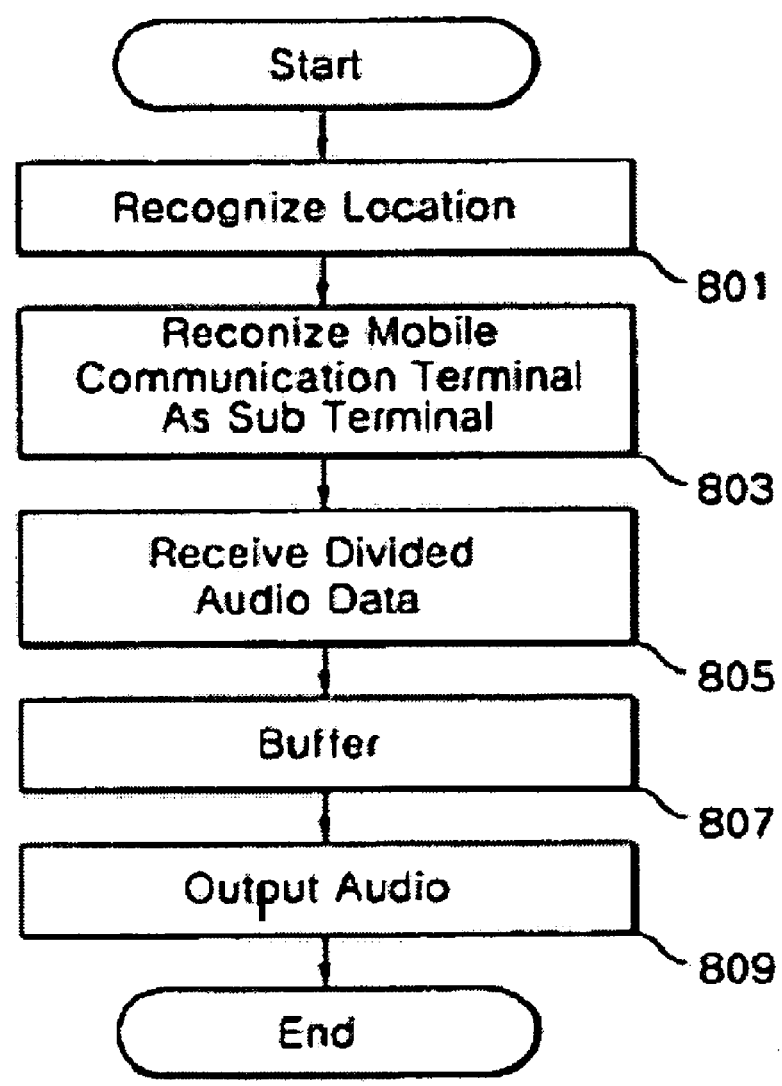
FIG. 9 is a flow chart showing an audio playback method of a mobile communication terminal in accordance with another embodiment of the present invention.

FIG. 9 is a flowchart showing an audio playback method of a mobile communication terminal in accordance with another embodiment of the present invention.

The control unit 117 recognizes the relative location of a mobile communication terminal corresponding to another mobile communication terminal (step 801). Next, the control unit 117 recognizes whether it is a main or a sub terminal (step 803). In an embodiment, it is determined by a user's playback order signal whether it is a main or a sub terminal. For example, when a user's audio playback order is input through the input unit 119 in FIG. 8 (step 603), the control unit 117 recognizes itself as a main terminal and notifies it to a control unit of another mobile communication terminal (step 605).

The control unit 315 recognizes itself as a sub terminal and waits for audio data to be received (step 803).

Next, the audio data is decoded and divided into two audio data, i.e., left-side and right-side audio data, by the other mobile communication terminal. The control unit 117 receives any one of the two divided audio data from a corresponding communication interface unit provided in the other mobile communication terminal through the communication interface unit (step 805). The control unit 117 outputs the received audio data to the outside through the audio output unit (step 809).

The present invention may further include the steps of buffering processed audio data and transmitting the buffered audio data to the audio output unit (step 807), and controlling the transmission timing corresponding to a synchronization control signal received from the other mobile communication terminal through the communication interface unit 313 (not shown).

These are steps for synchronizing images played in two mobile communication terminals. It is apparent to those skilled in the art that the two mobile communication terminals are synchronized to the same time source by transmitting a synchronization control signal to another mobile communication terminal according to a buffering condition of the buffering unit, and a detailed description thereof will thus be omitted herein.

As apparent from the above description, image data played in a single mobile communication terminal can be played back in two mobile communication terminals which play left-half and right-half of the image data.

In addition, since the two mobile communication terminals are communicated with each other by directly interconnecting between a right-side connector of any one of the mobile communication terminals and a left-side connector of the other one of the mobile communication terminals, two liquid crystal displays provided in the two mobile communication terminals are also adjacent to each other and thus two different image data appear to be continuously displayed, whereby users can view content more realistically through a wider screen.

Further, since the present invention deals with general audio data that can be decoded by the codec unit 109, the audio data may be downloaded or down streamed from an external server (not shown) through mobile communication processing. The audio data may exist alone or in combination with image data such as MPEG4 data. In addition, the audio data may be data recorded with photographed image data, data received with broadcasted image data, or data stored in the mobile communication terminal. A mobile communication terminal which is located at a left side relative to another mobile communication terminal can output left-side audio data to the outside via a left-side speaker, while the mobile communication terminal which is located at a right side relative to the other mobile communication terminal can output right-side audio data to the outside via a right-side speaker.

While the present invention has been described with reference to exemplary embodiments thereof, it will be understood by those skilled in the art that various changes in form and details may be made therein without departing from the scope of the present invention as defined by the following claims.

What is claimed is:

1. An audio playback device of a mobile communication terminal, comprising:

a control unit to recognize a relative location of the mobile communication terminal in relation to another mobile communication terminal, and to generate left-side or right-side location information corresponding to the relative location;

a codec unit to decode audio data and output decoded left-side and right-side audio data;

a path switching unit to transmit a first one of the two decoded audio data to an audio output unit and to transmit a second one of the two decoded audio data to a communication interface unit according to the location information;

an audio output unit to process and output the first one of the two divided audio data; and the communication interface unit to transmit the second one of the two divided audio data to the other mobile communication terminal.

2. The audio playback device of claim 1, wherein the audio data decoded by the codec unit is received from a mobile communication unit, a camera unit, a broadcast receiving unit, and/or a storing unit.

3. The audio playback device of claim 1,
wherein the mobile communication terminal includes a left-side connector and a right-side connector to couple with a corresponding connector in the other mobile communication terminal, the communication interface unit performs communication with a corresponding communication interface unit in the other mobile communication through the left-side connector or the right-side connector, and the control unit recognizes the relative location of the mobile communication terminal according to whether a connector coupled with the other mobile communication terminal is the left-side connector or the right-side connector.

4. The audio playback device of claim 3, wherein the left-side connector is receptacle and the right-side connector is a plug, or the right-side connector is a receptacle and the left-side connector is a plug.

5. The audio playback device of claim 1, further comprising a buffering unit to buffer audio data outputted from the path switching unit and to transmit the buffered audio data to the audio output unit, wherein the control unit transmits a synchronization control signal to the other mobile communication terminal through the communication interface unit according to a buffering condition of the buffering unit.

6. The audio playback device of claim 1, wherein the audio output unit with a stereo function outputs the audio data through a left output path of stereo output paths if the transmitted audio data corresponds to a left side, and outputs the audio data through a right output path of the stereo output paths if the transmitted audio data corresponds to a right side.

7. The audio playback device of claim 1, wherein if an order of division playback of the audio data is input from an input unit, the control unit notifies the other mobile communication terminal through the communication interface unit that the control unit is a main terminal.

8. An audio playback device of a mobile communication terminal, comprising:

a control unit to recognize a relative location of the mobile communication terminal in relation to another mobile communication terminal;

a first communication interface unit to receive a first one of two divided audio data, the divided audio data comprising left-side audio data and right-side audio data, from a second communication interface unit in the other mobile communication terminal; and an audio output unit to output the received audio data.

9. The audio playback device of claim 8, wherein the divided audio data is wirelessly received by a mobile communication unit of the other mobile communication terminal, photographed by a camera unit of the other mobile communication terminal, wirelessly received by a broadcast receiving unit of the other mobile communication terminal, and/or stored in a storing unit of the other mobile communication terminal.

10. The audio playback device of claim 8,
wherein the mobile communication terminal includes a left-side connector and a right-side connector to couple with a corresponding connector in the other mobile communication terminal, the first communication interface unit performs communication with the second communication interface unit in the other mobile communication through the left-side connector or the right-side connector, and the control unit recognizes the relative location of the mobile communication terminal according to whether a connector coupled with the other mobile communication terminal is the left-side connector or the right-side connector.

11. The audio playback device of claim 10, wherein the left-side connector is a receptacle and the right-side connector is a plug, or the right-side connector is a receptacle and the left-side connector is a plug.

12. The audio playback device of claim 8, further comprising a buffering unit to buffer the received audio data and to transmit the buffered audio data to the audio output unit, wherein the control unit controls a transmission timing of the buffering unit in response to a synchronization control signal received from the other mobile communication terminal through the first communication interface unit.

13. The audio playback device of claim 8, wherein the audio output unit with a stereo function outputs the audio data through a left output path of stereo output paths if the transmitted audio data corresponds to a left side, and outputs the audio data through a right output path of the stereo output paths if the transmitted audio data corresponds to a right side.

14. The audio playback device of claim 8, wherein the control unit receives information notifying that the other mobile communication terminal is a main terminal through the first communication interface unit, and waits for the first one of the two divided audio data to be received from the other mobile communication terminal.

* * * * *